(12) United States Patent
Park et al.

(10) Patent No.: US 6,477,126 B1
(45) Date of Patent: Nov. 5, 2002

(54) OPTICAL RECORDING MEDIUM AND METHOD OF ASSIGNING ITS SPARE AREA

(75) Inventors: Yong Cheol Park, Kyonggi-do (KR); Yong Hee Han, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/443,291

(22) Filed: Nov. 19, 1999

(30) Foreign Application Priority Data

Nov. 20, 1998 (KR) .......................................... 98-49937

(51) Int. Cl.[7] .................................................. G11B 7/00
(52) U.S. Cl. ................................ 369/59.25; 369/53.37; 369/53.15
(58) Field of Search ......................... 369/47.55, 53.12, 369/53.15, 53.17, 59.25, 53.37

(56) References Cited

U.S. PATENT DOCUMENTS

| 5,237,553 A | * | 8/1993 | Fukushima et al. ............ 369/58 |
| 5,303,219 A | * | 4/1994 | Kulakowski et al. .......... 369/53 |
| 5,418,767 A | * | 5/1995 | Gaudet et al. ................. 369/55 |
| 5,715,221 A | * | 2/1998 | Ito et al. ........................ 369/54 |
| 6,212,647 B1 | * | 4/2001 | Sims et al. ..................... 714/8 |
| 6,338,153 B1 | * | 1/2002 | Sasaki et al. ................ 714/710 |
| 6,367,038 B1 | * | 4/2002 | Ko .............................. 714/710 |

* cited by examiner

*Primary Examiner*—Nabil Hindi
(74) *Attorney, Agent, or Firm*—Birch, Stewart, Kolasch & Birch, LLP

(57) ABSTRACT

A rewritable optical recording medium and a method of assigning a spare area in the rewritable optical recording medium is disclosed. In the present invention, a primary spare area of optical discs, which have the same disc size and track pitch but different initial user sizes, are assigned to have a same size, thereby improving the compatibility the discs.

19 Claims, 6 Drawing Sheets

(mode-1)

(mode-2)

(mode-1)

OPTICAL RECORDING MEDIUM AND METHOD OF ASSIGNING ITS SPARE AREA

BACKGROUND OF THE INVENTION

1. Field of the Invention

The present invention relates to a rewritable optical recording medium and a method of assigning the spare area in the rewritable optical recording medium.

2. Discussion of Related Art

A rewritable optical recording medium generally includes a Rewritable Compact Disc (CD-RW) and a Rewritable Digital Versatile Disc (DVD-RW, DVD-RAM and DVD+RW). The rewritable optical disc performs repeated operations of recording and/or playback of the information on the disc. However, by the repeated operation, a mixture ratio of the mixture forming a recording layer for recording the information on the optical disc is changed from an initial mixture ratio thereof. Thus, the inherent characteristic of the optical disc is not maintained, thereby generating errors during the recording and/or playback of information. This is commonly known as degradation.

The area where degradation occurs is designated as a defect area which appears upon the implementation of formatting, recording and/or playback commands of the optical disc. The defect area of rewritable optical discs may also be generated due to scratches on the surface, particles such as dust, and errors during manufacturing. Therefore, to prevent data from being recorded on or playbacked from defect areas of the optical disc, an effective management system for the defect area is necessary.

FIG. 1 shows a defect management area (DMA) in a lead-in area and a lead-out area of the optical disc to manage a defect area. Particularly, the data area is divided into a plurality of zones for the defect area management, where each zone is further divided into a user area and a spare area. The user area is where data is actually written and the spare area is used when a defect occurs in the user area.

There are four DMAs in one disc, e.g. DVD-RAM, two of which exist in the lead-in area and two exist in the lead-out area. Because managing defective areas is important, the same contents are repeatedly recorded in all four DMAs to protect the data. Each DMA comprises two blocks of 32 sectors, where one block comprises 16 sectors. The first block of the DMA, called a DDS/PDL block, includes a disc definition structure (DDS) and a primary defect list (PDL). The second block of the DMA, called an SDL block, includes a secondary defect list (SDL). The PDL corresponds to a primary defect data storage and the SDL corresponds to a secondary defect data storage.

The PDL generally stores entries of defective sectors 5 caused during the manufacture of the disc or identified when formatting a disc, namely initializing and re-initializing a disc. Each entry is composed of an entry type and a sector number corresponding to a defective sector. The SDL lists defective areas in block units, thereby storing entries of defective blocks occurring after formatting or defective blocks which could not be stored in the PDL during the formatting. Each SDL entry has an area for storing a sector number of the first sector of a block having defective sectors, an area for storing a sector number of the first sector of a block replacing the defective block, and reserved areas. Accordingly, defective areas, i.e. defective sectors or defective blocks, within the data area are replaced with normal or non-defective sectors or blocks by a slipping replacement algorithm and a linear replacement algorithm.

The slipping replacement algorithm is utilized when a defective area is recorded in the PDL. As shown in FIG. 2(a), if defective sectors m and n, corresponding to sectors in the user area, are recorded in the PDL, such defective sectors are skipped to the next available sector. By replacing the defective sectors by subsequent sectors, data is written to a normal sector. As a result, the user area into which data is written slips and occupies the spare area in the amount equivalent to the skipped defective sectors. For example, if two defective sectors are registered in the PDL, data would occupy two sectors of the spare area.

The linear replacement algorithm is utilized when a defective block is recorded in the SDL or when a defective block is found during playback. As shown in FIG. 2(b), if defective blocks m and n, corresponding to blocks in either the user or spare area, are recorded on the SDL, such defective blocks are replaced by normal blocks in the spare area and the data to be recorded in the defective block are recorded in an assigned spare area.

As defective areas are compensated utilizing the spare area, methods of assigning the spare area play an important role in the defective area management. Typically, the spare area may be allocated in each zone or group of the data area or may be allocated in a designated portion of the data area. One method is to allocate the spare area at the inner rings of a disc, i.e. at the top of the data area, as shown in FIGS. 3(a) and 3(b). In such case, the spare area is called a Primary Spare Area. Namely, the data area excluding the primary spare area becomes the user area.

The primary spare area, assigned in an initial formatting process, is not given a logical sector number (LSN). Thus, the primary spare area is assigned when a manufacturer produces the optical disc or when a user initially formats an empty disc. A variety of sizes can be allocated for the primary spare area, depending upon an initial data recording capacity, i.e. the initial user area. For example, in order to provide a 4.7 GB(Giga byte) initial data recording capacity (i.e. initial user area) in a disc with a size of 120 mm, 26 MB (Mega Byte) may be allocated for the primary spare area, which maintains compatibility with DVD-ROM.

For purposes of explanation, a disc with an initial user area of less than 4.7 GB as in FIG. 3(a) will be considered to be in a first mode and a disc with an initial user area of 4.7 GB as in FIG. 3(b) will be considered to be in a second mode. For example, a disc in mode 1 may have a user area of 4.58 GB and a primary spare area of 145 MB.

Since the size of the primary spare area varies with the size of the initial user area as discussed above, the size of the primary spare area would vary depending upon whether a disc is in mode 1 or mode 2. In other words, although the sizes and track pitches of the two modes may be identical, the initial sizes of the primary spare area would be different according to the initial user area size. This deteriorates compatibility between the two modes.

SUMMARY OF THE INVENTION

Accordingly, an object of the present invention is to solve at least the problems and disadvantages of the related art.

An object of the present invention is to provide an optical recording medium which assigns a primary spare area of the same size to mediums having different initial user area sizes.

Another object of the present invention is to provide an optical recording medium, in which a spare area is assigned during formatting in both the inner and outer rings of the optical recording medium depending upon a mode.

A further object of the present invention is to provide a method of assigning a spare area of an optical recording medium, in which both the primary spare area and secondary spare area are assigned or only the primary spare area is assigned during formatting, depending upon a mode.

A still further object of the present invention is to provide a method of assigning a spare area of an optical recording medium in which conversions between modes is available.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, an optical recording medium according to the present invention has a data area divided into a user area and a spare area, in which initial primary spare areas of different optical recording media, having a same data area but different initial user sizes, have the same size.

Also, a method of assigning a spare area of an optical recording medium according to the present invention assigns, during formatting, a primary spare area in at least two modes, depending upon the desired user area size. One assigns the primary spare area in the inner ring of the recording medium and the other assigns both a primary spare area and a supplementary spare area in the inner and outer rings of the recording medium respectively.

In the above method of assigning a spare area of an optical recording medium, the primary spare area is assigned to have the same size regardless of the mode. Also, conversion between the two modes is allowed.

BRIEF DESCRIPTION OF THE ATTACHED DRAWINGS

The invention will be described in detail with reference to the following drawings in which like reference numerals refer to like elements wherein.

Figure 1:
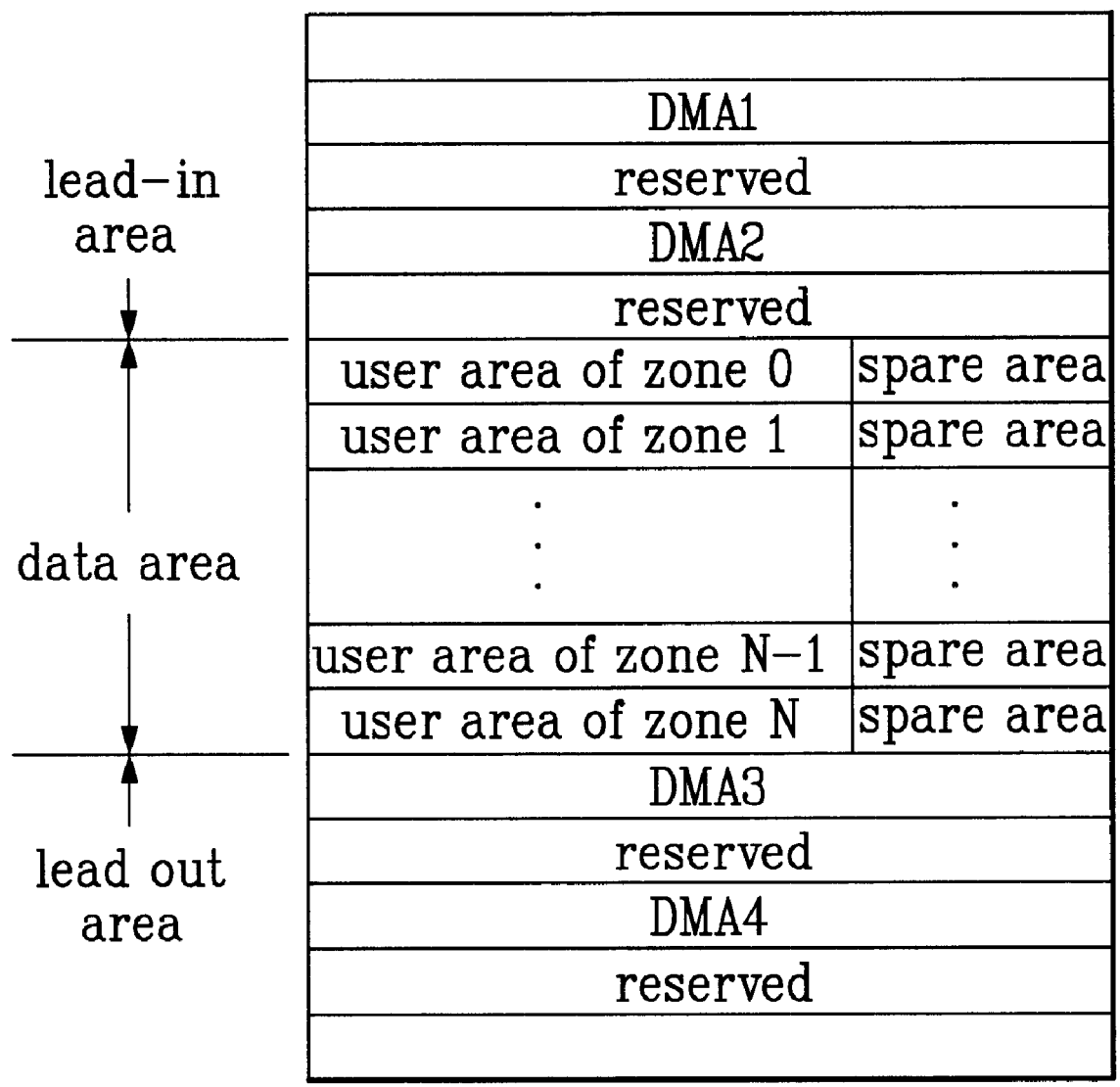
FIG. 1 shows a structure of an optical disc in the related art.
Figure 2A:
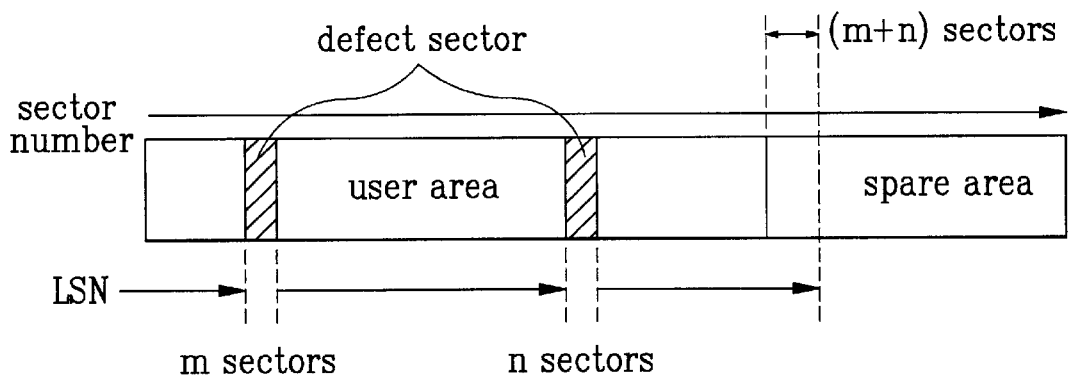
FIG. 2(a) shows a slipping replacement algorithm in the related art.
Figure 2B:
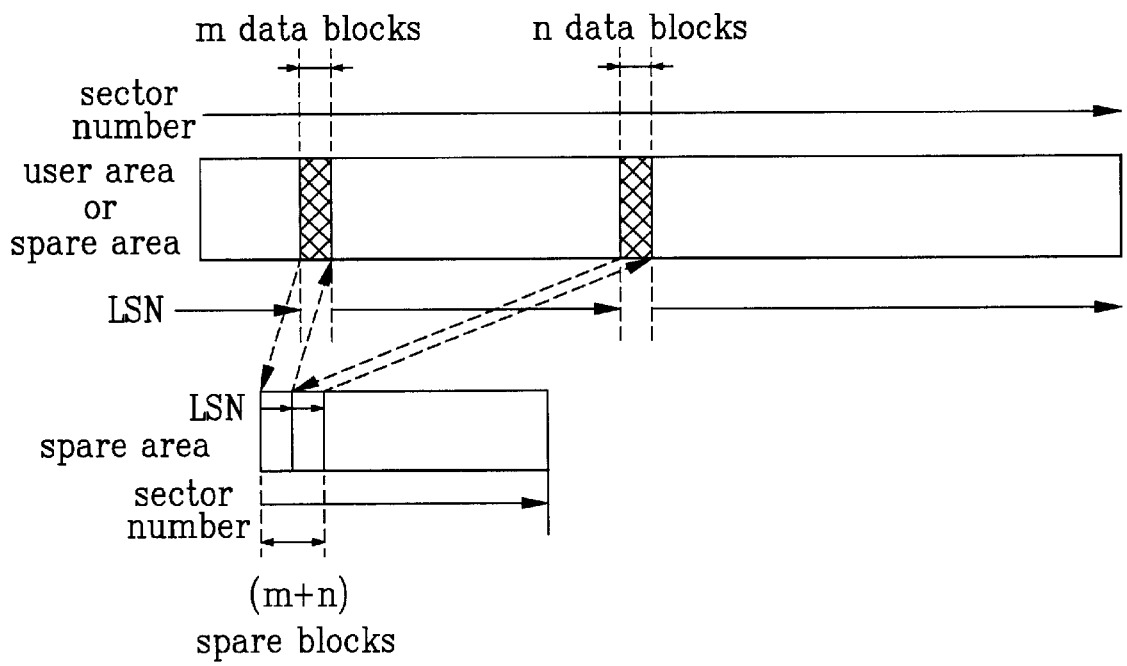
FIG. 2(b) shows a linear replacement algorithm in the related art.
Figure 3A:
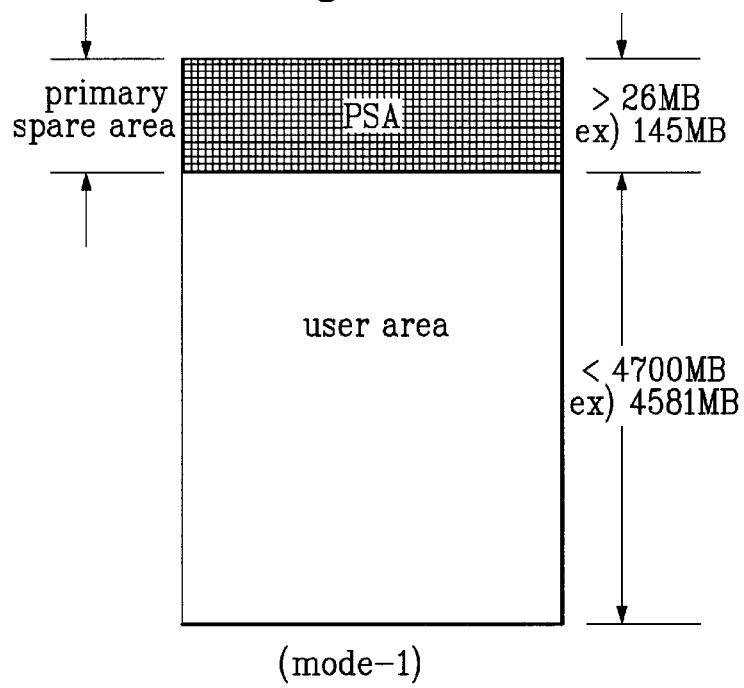
Figure 3B:
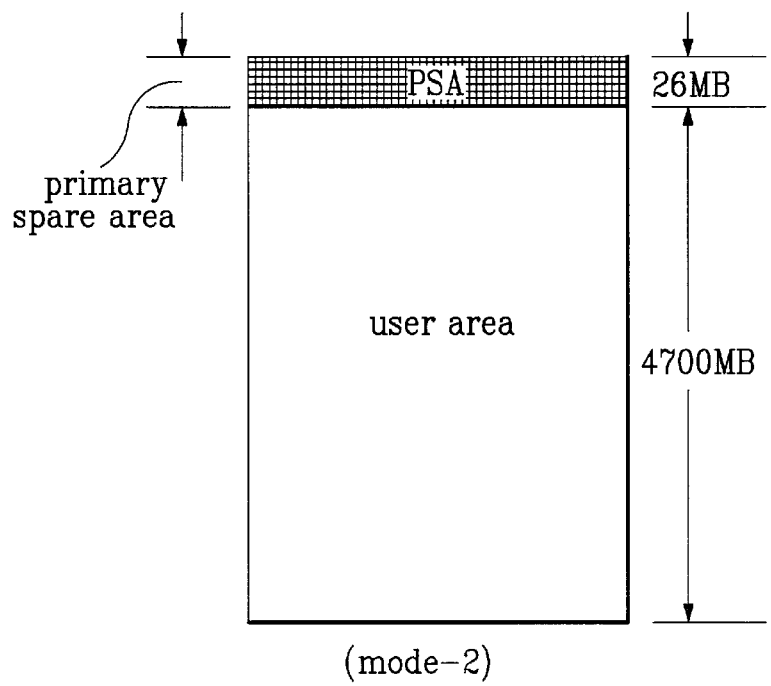
Figure 4A:
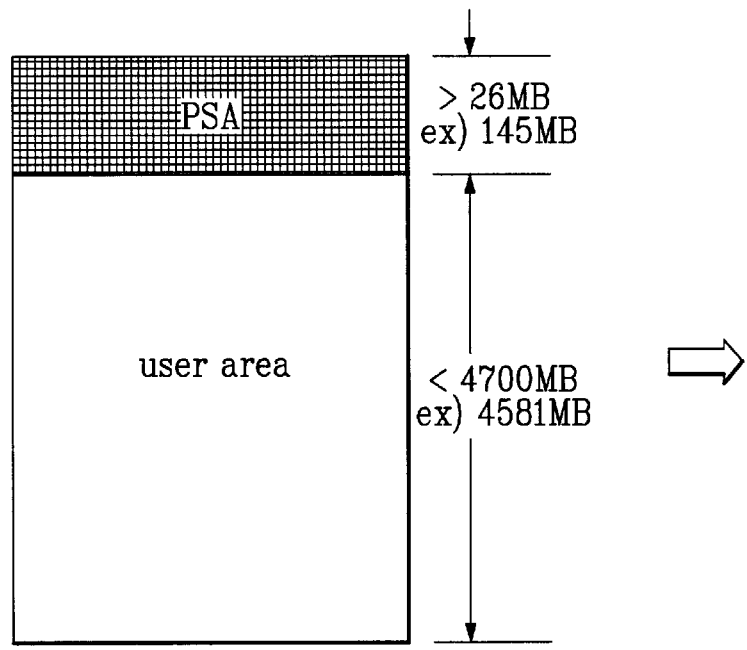
Figure 4B:
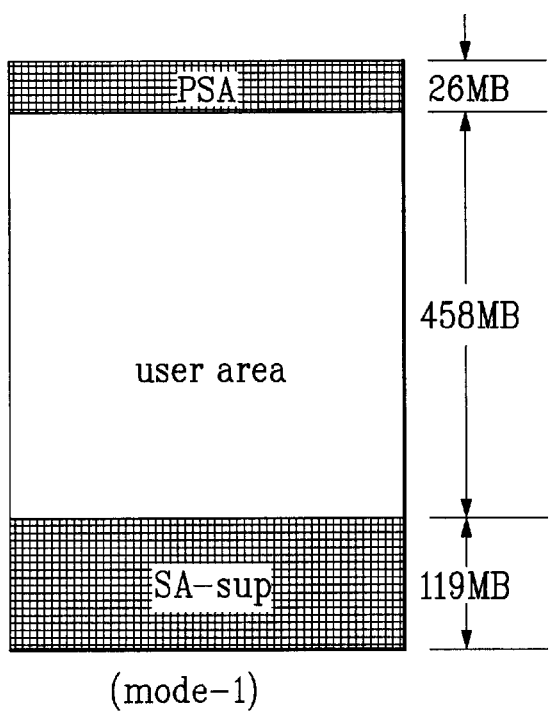
Figure 5:
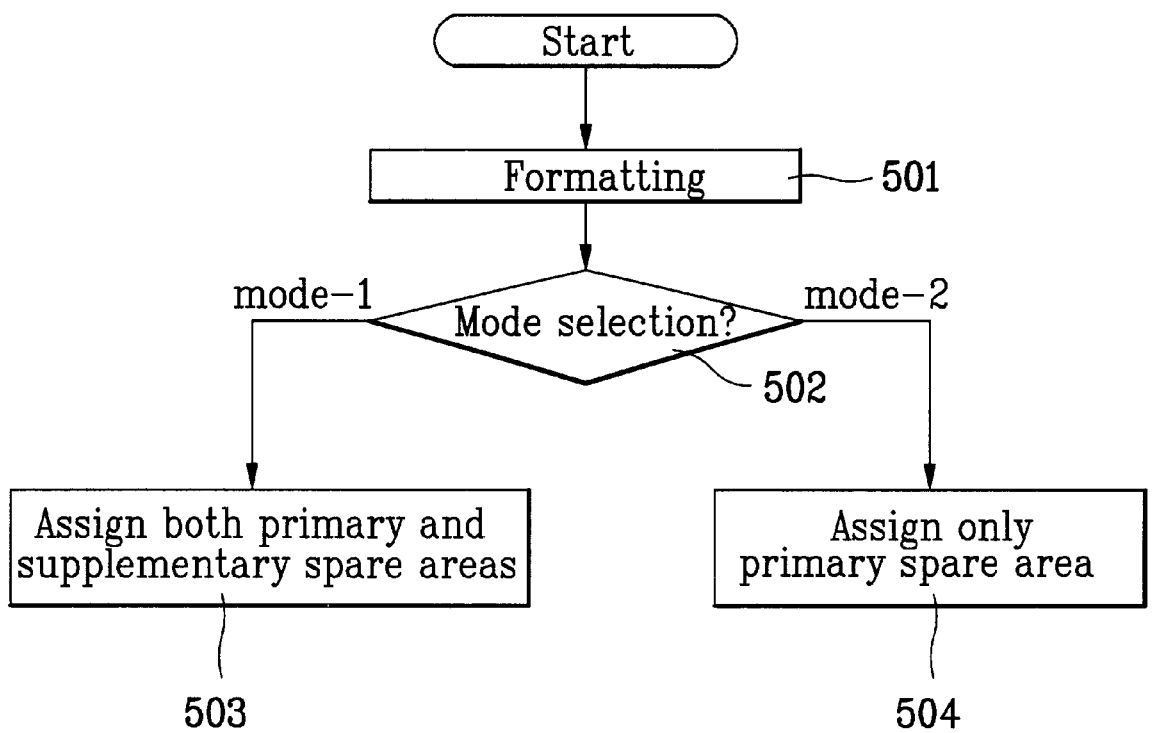
Figure 6:
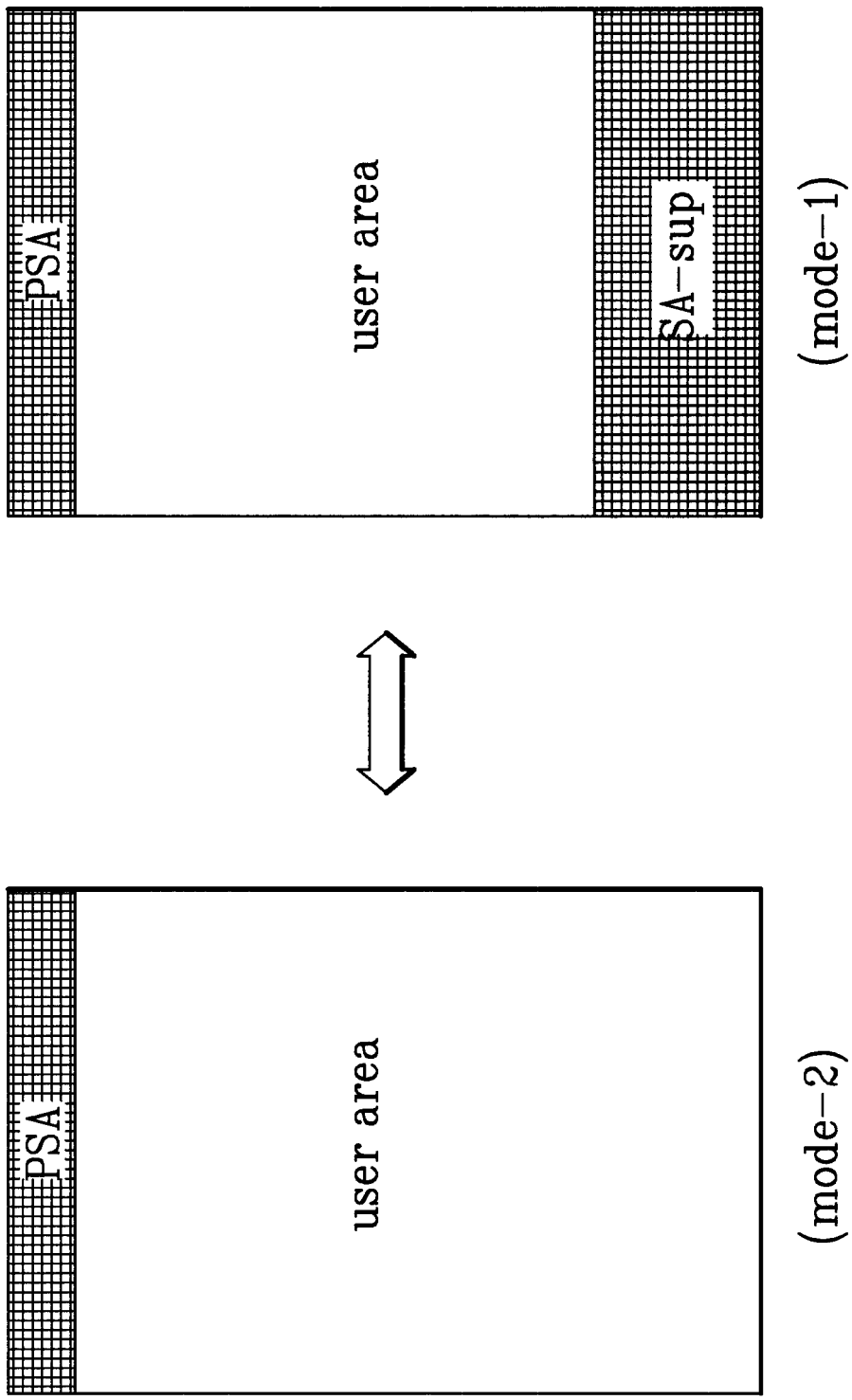

FIGS. 3(a) and (b) show examples in which a spare area is assigned at the top of the data area;

FIG. 4(a) shows an example of assignment of the spare area in a first mode according to the present invention;

FIG. 4(b) shows an example in which primary spare areas of two modes are assigned to have the same size according to the present invention;

FIG. 5 is a flow chart showing a method of assigning the spare area of the optical recording medium according to the present invention; and FIG. 6 shows a conversion process between the modes in the optical recording medium according to the present invention.

DETAILED DESCRIPTION OF PREFERRED EMBODIMENT

Reference will now be made in detail to the preferred embodiments of the present invention, examples of which are illustrated in the accompanying drawings.

Generally, the present invention allows an assignment of primary spare area of the same size in discs of the same size and track pitch but different initial user area sizes, thereby improving the compatibility among different discs. For purposes of explanation, a disc with a size of 120 mm (hereinafter "the disc") will be used to explain the present invention. However, the present invention is not limited to this example.

The disc may have an initial user area of 4.7 GB and a primary spare area of 26 MB, as discussed above. In such case, a primary spare area of 26MB would still be allocated to the 120 mm disc with less than 4.7 GB of an initial user area. The disc will be considered to be in a first mode when the initial user area is less than 4.7 GB and in a second mode when the initial user area is equal 4.7 GB.

In the first mode, since a primary spare area of the same size is allocated while less initial user area than the first mode is assigned, a portion of the data area remains. This remaining portion will be referred to as a secondary spare area. Particularly, the secondary spare area is equal to the total data area minus the sum of the user area and the primary spare area. For example, if the initial user area of the disc is 4.58 GB, the total spare area would be 145 MB as shown in FIG. 4(a) and if 26 MB is allocated as the primary spare area, the size of the secondary spare area would be 119 MB. The secondary spare area may be assigned as a supplementary spare area at the outer rings of a disc or near the bottom of the data area, as shown in FIG. 4(b).

The secondary spare area is assigned as the supplementary spare area simultaneously when the primary spare area is assigned. Namely, the primary and supplementary spare areas of the first mode may be assigned when the disc manufacturer fabricates the disc or when a user formats the disc as shown in FIGS. 4(a) and 4(b). Similarly, the primary spare area of a disc in the second mode is assigned in the same way. However, the supplementary spare area of a disc in the second mode is assigned when necessary as data is recorded or playbacked from a disc.

Also, the primary spare area of a disc in either the first mode or the second mode is not given a LSN, as discussed above. However, for the disc in the second mode, the LSN is not given to the supplementary spare area as well as the primary spare area. Particularly, the LSN is given to the user area of both the first and second modes.

Furthermore, for convenience of the user of a disc, either the manufacturer or the user can select between the first mode or the second mode, when a disc is formatted. Referring to FIG. 5, when formatting is selected (step 501), the manufacturer or user may select a mode (step 502). If the first mode is selected, both a primary and a supplementary spare areas would be assigned at the top and bottom of a disc, respectively (step 503). If the second mode is selected, only a primary spare area would be assigned at the top of the data area (504) and a supplementary spare area would be assigned later, as needed, during a recording/reproduction operation as discussed above.

Thus, if the first mode is selected when formatting a disc, all three areas, i.e. a primary spare area, a supplementary spare area and a user area, would be assigned. For example, a primary spare area of 26 MB, a user area of 4.58 GB and a supplementary spare area of 119 MB may be assigned to the disc. On the other hand, if the second mode is selected when formatting a disc, a primary spare area and a user area would be assigned while a supplementary spare area may be assigned as necessary when recording or playing back data from a disc. For example, a primary spare area of 26 MB and a user area of 4.7 GB would be assigned to the disc during the formatting of the disc.

Moreover, the present invention allows a conversion between the first and second mode for further convenience of a user. This is possible because both modes have a primary spare area of the same size.

If a disc being used needs to be converted from the first mode to the second mode, the assignment of the supplementary spare area can be simply canceled through a formatting as shown in FIG. 6. For this conversion, the defective blocks registered in the SDL or only the defective sectors in the defective blocks registered in the SDL would be registered in the PDL. Also, a number of sectors within the supplementary spare area equivalent to the defective sectors newly registered in the PDL would slip into or become a part of the user area to maintain the initial user area. Once converted, the supplementary spare area may be assigned again as necessary when the primary spare area becomes full.

If a disc being used needs to be converted from the second mode to the first mode, a reverse process of a conversion from the first mode to the second mode is performed. Particularly, a primary spare area and a supplementary spare area are simultaneously and accordingly assigned through formatting. Referring back to FIGS. 4(a) and 4(b), if the disc in the second mode has an initial user area of 4.7 GB, 26 MB would be assigned at the top of the data area as the primary spare area and 119MB would simultaneously be assigned as the supplementary spare area near the bottom of the data area. Also, similar to the conversion from the first to the second mode, defective blocks registered in the PDL or only the defective sectors in the defective blocks registered in the PDL would be registered in the SDL.

As described above, in the method of assigning the spare area of the optical recording medium according to the present invention, the primary spare areas of discs in the first and the second modes are assigned to have the same initial size, improving compatibility between the two modes. Moreover, while the supplementary spare area of the first mode is assigned simultaneously with the primary spare area and the supplementary spare area of the second mode is assigned if required, a selection between the modes can be made through mode conversion when the disc is formatted. Finally, although a disc with a size of 120 mm has been used for purposes of illustration, the present invention can be applied to any discs with the same disc size but different initial user area sizes.

The foregoing embodiments are merely exemplary and are not to be construed as limiting the present invention. The present teachings can be readily applied to other types of apparatuses and/or recording mediums. The description of the present invention is intended to be illustrative, and not to limit the scope of the claims. Many alternatives, modifications, and variations will be apparent to those skilled in the art.

What is claimed is:

1. A method of assigning a spare area of an optical recording medium having a data area, the method comprising:
   providing a first mode in which both a primary spare area and a supplementary spare area are assigned;
   providing a second mode in which a primary spare area is assigned; and
   assigning the spare area according to one of either the first mode or the second mode when the optical recording medium is formatted.

2. A method of claim 1, wherein sizes of the primary spare area of the first and second modes are equivalent.

3. A method of claim 1, wherein a size of the primary spare area in the first mode is determined based upon a size of the primary spare area in the second mode.

4. A method of claim 1, wherein a size of the supplementary spare area in the first mode is determined by subtracting a size of the primary spare area and a size of a user area from the data area size of the optical recording medium.

5. A method of claim 1, wherein the second mode further comprises assigning a supplementary spare area as necessary while data is recorded in and/or playbacked from the optical recording medium.

6. A method of claim 1, wherein the primary spare area in the first and second mode is assigned at the top of the data area of the optical recording medium.

7. A method of claim 1, wherein the supplementary spare area in the first mode is assigned near the bottom of the data area of the optical recording medium.

8. A method of claim 1, wherein the supplementary spare area in the first mode is assigned without a logical sector number (LSN).

9. A method of claim 1, wherein in the assigning step, the spare area is assigned according to one of either the first mode or the second mode based upon a selection by a user or a manufacturer.

10. A method of claim 9, wherein sizes of the primary spare area of the first and second modes are equivalent.

11. A method of claim 10, further comprising converting from the first mode to the second mode if the second mode was selected or converting from the second mode to the first mode if the first mode was selected, based upon a selection by a user or a manufacturer.

12. A method of claim 11, wherein the converting step further comprises registering either defective blocks registered in a supplementary defect list (SDL) or only defective sectors in defective blocks registered in the SDL of the optical recording medium, into a primary defect list (PDL) of the optical recording medium.

13. A method of claim 11, wherein the first mode is converted to the second mode by canceling the assigned supplementary spare area when formatting the optical recording medium.

14. A method of claim 11, wherein the second mode is converted to the first mode by assigning both the primary spare area and the supplementary spare area when formatting the optical recording medium.

15. An optical recording medium having a data area in which a spare area is assigned by:
   providing a first mode in which both a primary spare area and a supplementary spare area are assigned;
   providing a second mode in which a primary spare area is assigned; and
   assigning the spare area according to one of either the first mode or the second mode when the optical recording medium is formatted.

16. An optical recording medium of claim 15, wherein the spare area is assigned according to one of either the first mode or the second mode based upon a selection by a user or a manufacturer.

17. An optical recording medium of claim 16, wherein sizes of the primary spare area of the first and second modes are equivalent.

18. An optical recording medium of claim 15, wherein the primary spare area in the first and second mode is assigned at the top of the data area of the optical recording medium.

19. An optical recording medium of claim 15, wherein the supplementary spare area in the first mode is assigned near the bottom of the data area of the optical recording medium.

* * * * *